Patented Mar. 12, 1929.

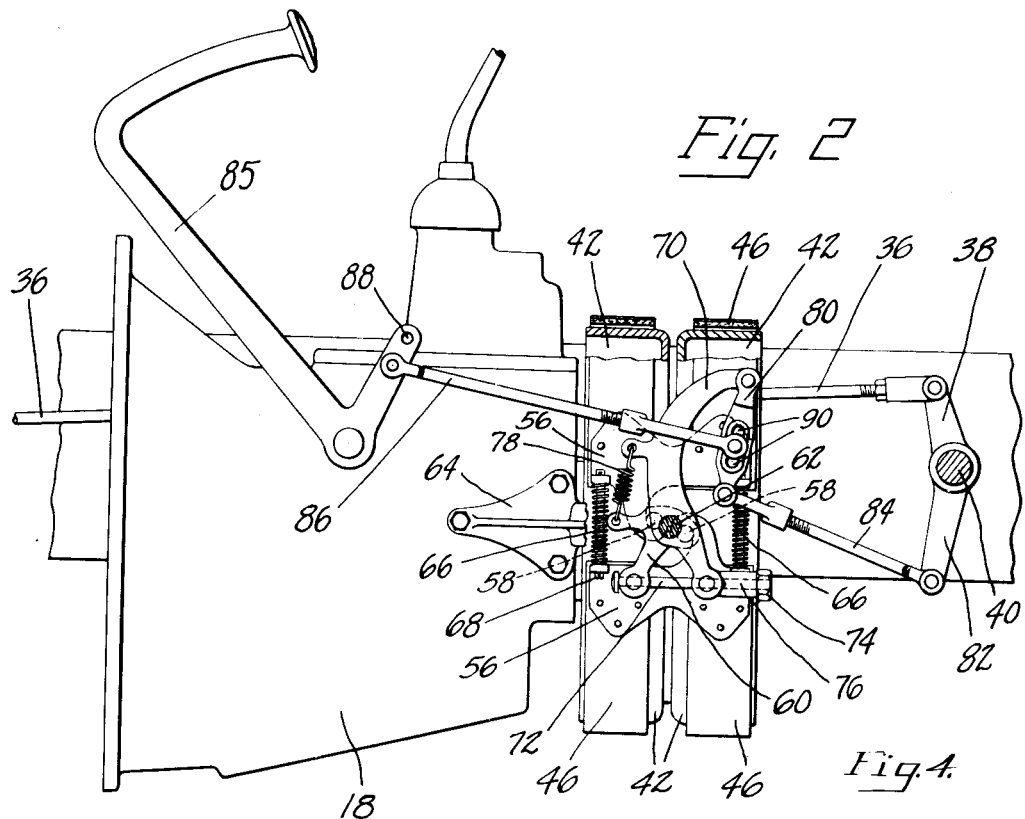
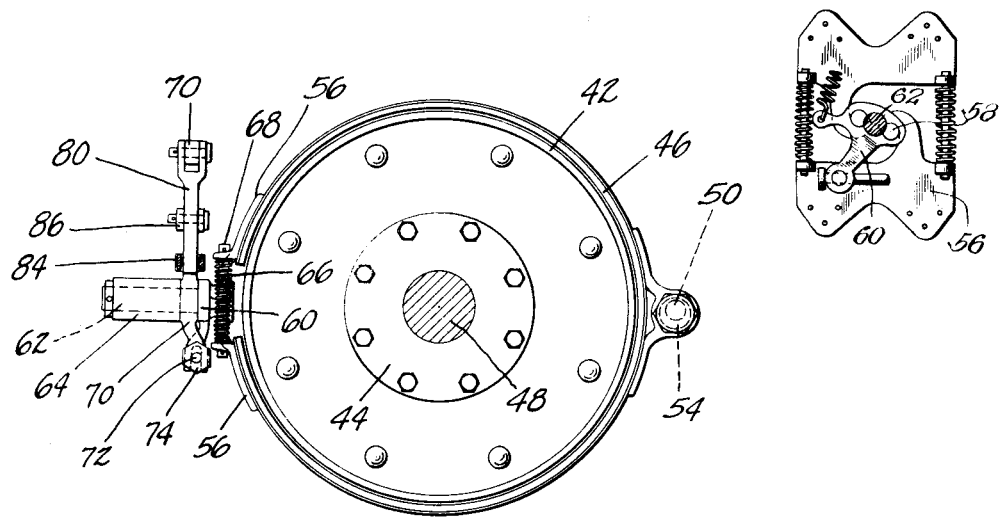

1,705,035

UNITED STATES PATENT OFFICE.

ARTHUR H. STAHLHUTH, OF DETROIT, MICHIGAN, ASSIGNOR TO GENERAL MOTORS CORPORATION, OF DETROIT, MICHIGAN, A CORPORATION OF DELAWARE.

VEHICLE BRAKE.

Application filed June 25, 1924. Serial No. 722,293.

This invention relates to brakes for motor vehicles, and is illustrated as embodied in an automobile having brakes on the front wheels and having a novel transmission brake, all operated by improved equalizing connections, the emergency brakes being shown on the rear wheels. One feature of the invention relates to the balancing of the front brakes against the transmission brakes by such connections, as for example by a vertically-arranged equalizer connected to vertical arms operating respectively the front brakes and the transmission brakes. The illustrated transmission brake also embodies in itself several features of novelty, having a drum which is very strong but with a large friction surface secured by placing back to back two members with flanges which are secured to a central plate, and having novel means for contracting duplicate brake bands, together with a new and strong brake band mounting carried by the transmission housing.

The above and other features of the invention will be apparent from the following description of one illustrative embodiment shown in the accompanying drawings, in which:

Figure 2 is a side elevation of the transmission and associated parts;

Figure 3 is a rear elevation of the transmission brake; and

Figure 4 illustrates a detail in side elevation.

Figure 1:
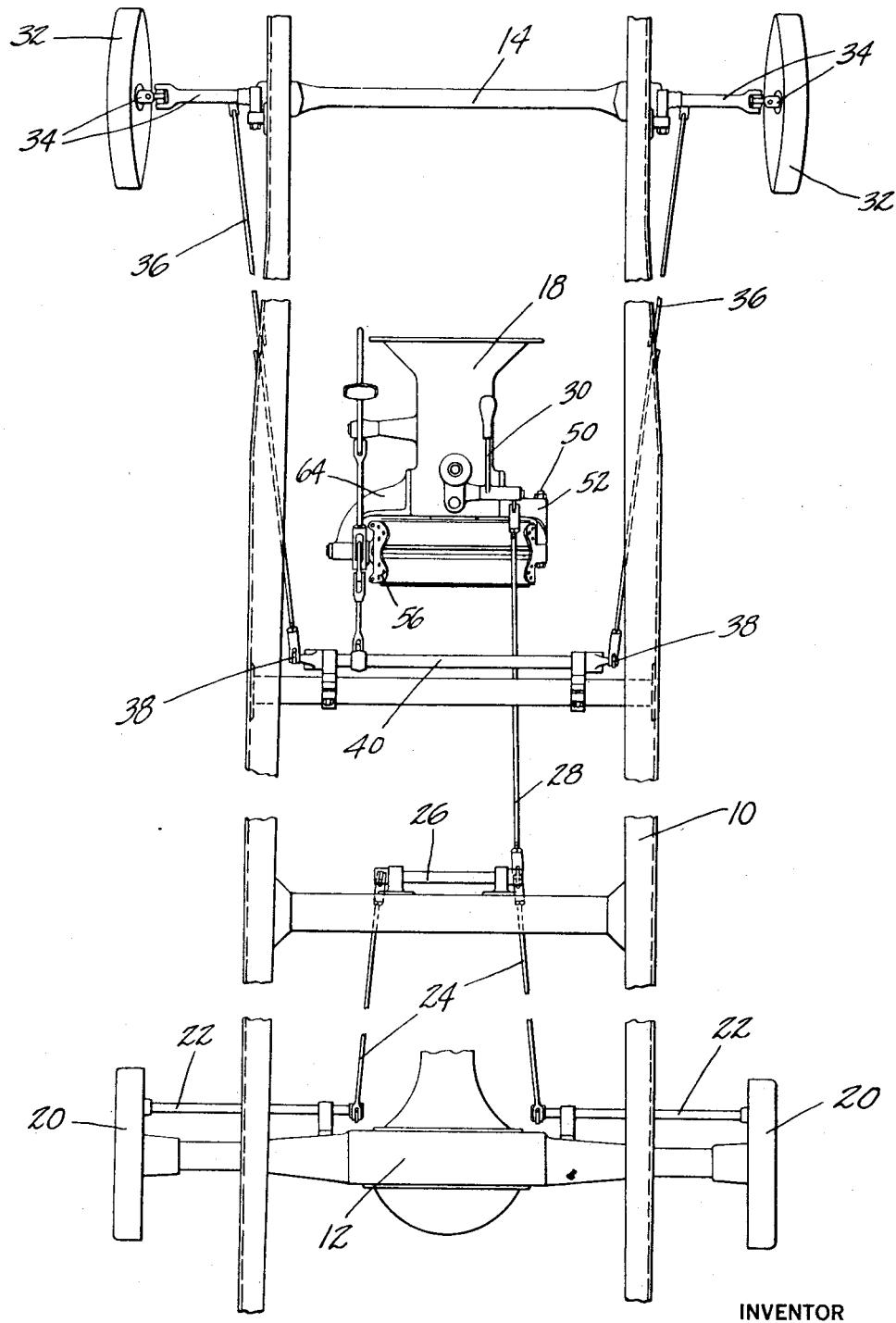
Figure 1 is a top plan view of part of a chassis, showing the brakes.

The parts of the chassis shown include the frame 10, rear axle 12, front axel 14 carrying steering knuckles, and the transmission and its housing 18. The rear brakes 20, which in this instance are the emergency brakes, are operated by shafts 22 rocked by links 24 connected to an operating shaft 26 having a link 28 from the emergency brake lever 30.

The front brakes 32 are operated by flexible shafts 34 rocked by links 36 from arms 38 on opposite ends of a cross shaft 40. On the transmission is a brake comprising a drum of two duplicate parts 42 having inwardly-extending flanges and arranged back to back and secured to a central plate or hub 44 operated by the shaft 48 of transmission 18. Two brake bands 46 surround the parts 42 and are anchored on a bolt 50 carried by an arm 52 secured to the transmission housing, adjustment being provided by an eccentric bushing 54. The free ends of the bands are connected by plates 56 formed with oppositely-arranged hooks engaging projections 58 on a lever 60, and which are on opposite sides of the axis of the pivotal mounting 62 for the lever, this mounting being carried by an arm 64 secured to the transmission housing. The bands are urged toward idle position by coil springs 66 surrounding guide pins 68 passing through lugs formed on plates 56. Lever 60 is adjustably connected to a vertical operating lever 70 also pivoted on pivot mounting 62 by a bolt 72 and nut 74, a spacer 76 being provided to bring the nut clear of the brake drum (Figure 2). Adjustment is made by tightening up on nut 74 against the resistance of a spring 78.

The front and transmission brakes are operated by a vertical equalizer bar 80, directly pivoted to lever 70 and adjustably connected to an arm 82 on shaft 40 by a link 84. The equalizer bar is directly connected to a service brake pedal 85 by an adjustable link 86, which can be connected to the pedal at either of two perforations 88, and which can be connected to the equalizer bar 80 at any one of three perforations 90, according to the leverage and distribution of power desired.

By this arrangement, depression of pedal 85 operates through the equalizer bar 80 to rock shaft 40, applying the front brakes, and to rock lever 60, applying the transmission brakes. The design provides a very compact arrangement which is capable of easy and accurate adjustment.

While one illustrative embodiment has been described in detail, it is not the intention to limit the scope of the invention to that particular embodiment, or otherwise than by the terms of the appended claims.

I claim:

1. A vehicle comprising, in combination, rear wheels and front dirigible wheels, a transmission, brakes acting on the front wheels, a transmission brake acting on the rear wheels, a vertically arranged lever and connections therefrom to the front brakes, a second vertically arranged lever operating the transmission brake, an equalizer connecting the two levers, and a driver-controlled connection for operating the equalizer.

2. A transmission and brake assembly for motor vehicles comprising, in combination, a transmission having a housing, a brake drum at the rear end of the transmission, arms secured one to each side of the transmission housing extending adjacent the corresponding side of the drum, a brake band surrounding the drum and anchored to one of said arms, a band-contracting device mounted on the opposite arm and connected to the ends of the band; a vertically arranged lever also mounted upon said last mentioned arm; a vertically arranged equalizer, the upper end of which is operatively connected with the upper end of said lever, and the lower end of which is operatively connected with front wheel brakes of the vehicle; and a driver controlled brake applying member operatively connected with said equalizer intermediate the ends thereof.

3. A brake system for vehicles having front wheel brakes, a transversely positioned transmission brake to restrain the movement of the rear wheels, a lever, transversely pivoted to swing longitudinally, means connecting one arm of said lever and the transmission brake for applying the same, an equalizer pivoted at one end to the other arm of said lever, manually operable means connected to an intermediate point on said equalizer a linkage connecting the other end of said equalizer to the front wheel brakes.

In testimony whereof I affix my signature.

ARTHUR H. STAHLHUTH.